United States Patent [19]

Brumagim

[11] 4,037,002
[45] July 19, 1977

[54] METHOD AND PROCESS FOR TREATING RUMEN CONTENT

[76] Inventor: Ivan S. Brumagim, 2 Woodlawn Drive, North Warren, Pa. 16365

[21] Appl. No.: 537,833

[22] Filed: Dec. 31, 1974

Related U.S. Application Data

[63] Continuation-in-part of Ser. No. 384,909, Aug. 2, 1973, abandoned.

[51] Int. Cl.$^2$ .................... A23K 1/08; A23K 1/10
[52] U.S. Cl. ............................ 426/641; 426/807; 426/495; 426/521
[58] Field of Search .......... 426/641, 656, 478, 490, 426/492, 495, 521, 807, 645, 635, 388; 159/DIG. 20, 13, 19; 203/7, 37; 210/71

[56] References Cited

U.S. PATENT DOCUMENTS

| 1,071,218 | 8/1913 | Dyck | 426/212 |
|---|---|---|---|
| 3,545,977 | 12/1970 | Stahler | 426/641 |
| 3,550,524 | 12/1970 | Brumagim | 99/470 |

FOREIGN PATENT DOCUMENTS

| 724,266 | 11/1952 | United Kingdom | 203/7 |

*Primary Examiner*—Hiram H. Bernstein

[57] ABSTRACT

In the process disclosed herein, paunch manure is treated by sterilizing, mechanically separating the gross solids from the liquid, retaining the solids as animal feed, converting the several acids in the liquids to their various salts, concentrating the residual solids in the neutralized liquids by evaporation to about 80% liquid content then recycling the resulting concentrate through the process or mechanically separating the solids from this concentrate to produce a high nutrient animal feed additive.

It is most important that the final separation of water from the material be accomplished by evaporation. This is because the material contains (1) so many extremely small and microscopic solid particles, and (2) such a large quantity of dissolved ingredients, neither of which can be economically separated from the water content except by evaporation. The liquid effluent from the press contains approximately half of the nutrients in the raw material; however, these nutrients are proteins, carbohydrates, vitamins, amino and other acids and fat, all of which have many times more value per pound than the fiber and other solids removed by the press previous to the concentration and recycling of its liquid effluent. The removal of the gross solids from the material by the press produces a low viscosity effluent, containing only about 5 percent solids, by weight, from which a large volume of water can be evaporated without producing an excessively viscous concentrate. The evaporator has adequate burner capacity and heat transfer surface to provide the necessary B.t.u.'s to evaporate the required water content. The quantity and nature of the ingredients in the effluent, however, requires that the evaporator be provided with scraping blades to eliminate "baking on" of the concentrate on the heat transfer surfaces and good agitation of its content to promote rapid heat penetration therein. Having neutralized the acids in the liquid effluent the steam from the evaporator is non-corrosive, will not pollute the streams or the atmosphere and can reach a pressure of 300 p.s.i. thereby replacing the fuel and water used to develop an equivalent amount of steam by a conventional boiler.

1 Claim, 2 Drawing Figures

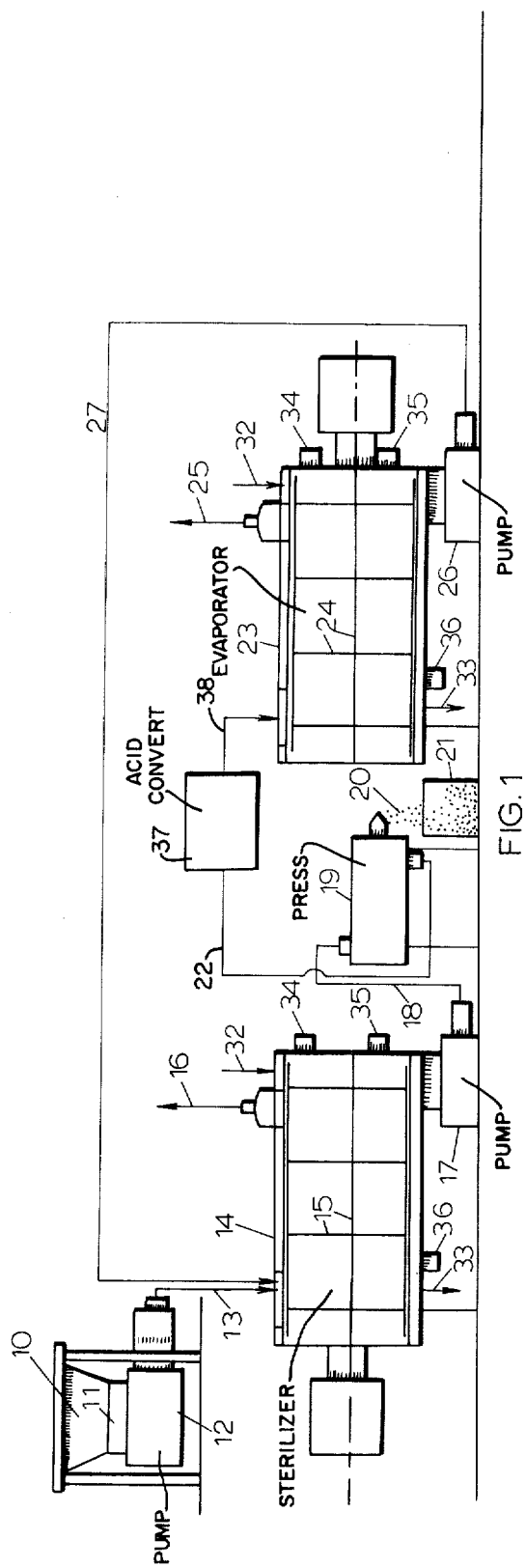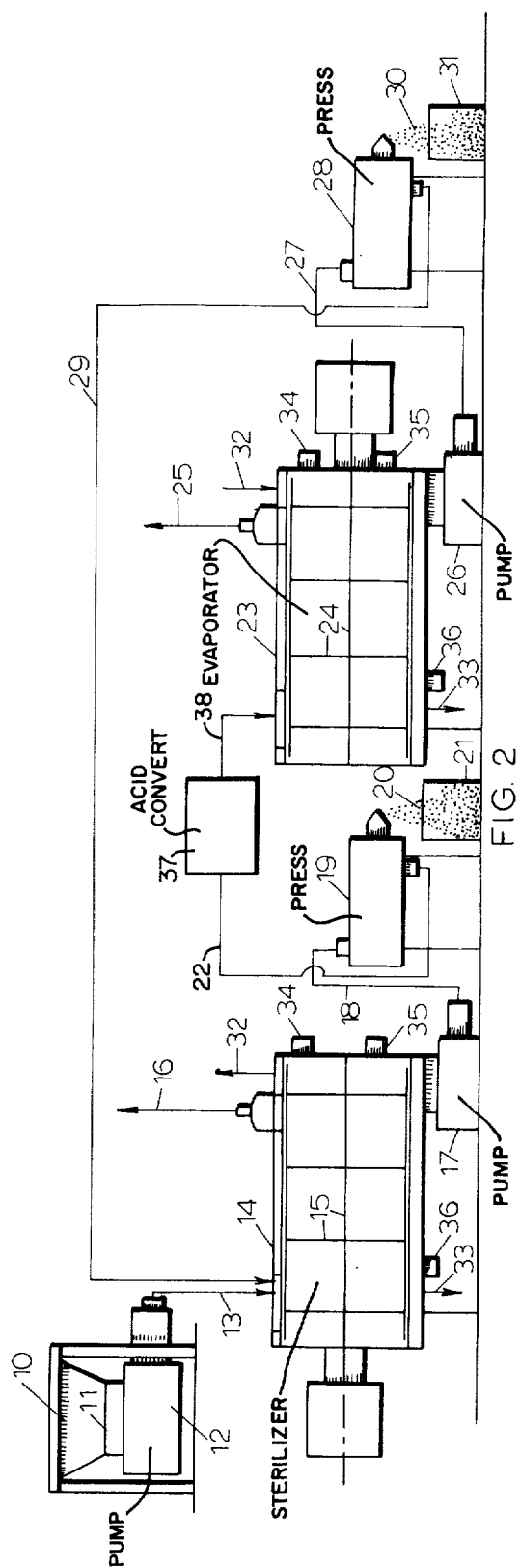

METHOD AND PROCESS FOR TREATING RUMEN CONTENT

REFERENCE TO PRIOR APPLICATIONS

An improvement over the process disclosed in continuation-in-part patent application, Ser. No. 384,909 filed Aug. 2, 1973, and now abandoned is disclosed herein.

STATEMENT OF INVENTION

The present invention relates to a processing system and more particularly to improvements to the system for processing by sterilization, mechanical separation, evaporation and recycling whereby paunch manure is converted from an obnoxious air and water pollutant into a palatable and high grade feed for livestock or other useful products, covered by my U.S. Pat. No. 3,550,524.

GENERAL DESCRIPTION OF THE INVENTION

Paunch manure, which hereinafter will be referred to as material, is the content of the rumen or first stomach of a ruminating animal, which, unlike other animals, has four stomachs instead of one. Common domestic animals of this family are cattle and sheep.

The rumen is a thick skinned sac of tough flesh, which is processed by the meat packer into a saleable product called tripe.

Presently, except in rare cases where all of the material is dumped into the sewers or streams, the packer conveys the material over shaking screens and drains only the liquid effluent therefrom into the sewer. Both the material and the liquid effluent from the screens are serious water pollutants, and both contain much valuable nutritional content.

The water saturated solids retained on the shaking screens are disposed of in several ways. Some of these solids are trucked to land fills and occasionally they are burned. The material burns with a slow smoldering flame, which creates an obnoxious air polluting smudge.

In a few cases, these saturated solids are trucked to cattle feeding lots where at least a part of the material is sterilized and fed to cattle. However, the exorbitant cost of trucking such water saturated solids and the large loss of valuable nutrients in the liquid effluent dumped into the sewers from this sterilizing process, make this means of disposal uneconomical and fails to solve the problem of water pollution.

Laboratory analyses, on a dry basis, of the nutritional ingredients in the material compare favorably with published analyses of growing rations fed by successful cattle feeders. However, federal, state and local regulations prohibit its use as livestock feed except after pathogenic sterilization. In addition, the material is considered a contaminant to packing house products and facilities and the authorities regulate its handling through certain areas of the packer's plant. Furthermore, at a moisture content in excess of about 60 percent, the material is not palatable to cattle and deteriorates rapidly in storage.

In order, therefore, to convert this obnoxious air and water pollutant into a satisfactory livestock feed, it is necessary to (a) prevent the material from coming in contact with other products of facilities in the packing plant, (b) pathogenically sterilize the material, (c) dehydrate the material to the optimum moisture content required either for immediate feeding, storage or sale, and (d) prevent any liquid effluent from escaping from the processing system.

The fibrous and tacky nature of the material, because of its makeup of water, fiber, proteins, carbohydrates, fat and ash, especially when the water content drops below about 80 percent by weight, makes it extremely resistant to flow. It is, therefore, difficult if not impossible, to force sufficient heat into any sizeable mass of the material to accomplish either adequate sterilization or significant dehydration. Furthermore, because there is so little heat transfer into the mass, the material immediately in contact with the heating medium dries quickly and ignites. The resulting smoldering fire is difficult to quench and progresses slowly through the mass giving off an obnoxious air polluting smudge.

Dehydration by mechanical means, such as the screw press, produces a product which is palatable to cattle and easily stored. The screw press, however, does not sterilize the material. In addition, it produces a large volume of liquid effluent which when dumped into the sewers becomes a serious water pollutant. Furthermore, the valuable nutrients contained therein are lost. These nutrients, which are very finely divided particles or dissolved ingredients, consist of approximately half of the total proteins and carbohydrates contained in the raw material.

In order to improve and perfect the prior art of sterilizing and dehydrating paunch manure, it is necessary to successfully cope with a number of separate problems: (a) government regulations, (b) the physical and chemical characteristics of the material and (c) the specific conditions required for a satisfactory finished product.

There are four basic and necessarily successive processes in the system. (1) sterilization of the material by indirect heat, (2) separation of fiber and other separable solids from the material's liquid content by mechanical means, such as a screw or centrifuge, (3) concentration of the liquid content by evaporation, and (4) recycling of the concentrate through the system.

The sterilization of the material must be the first process step in order to insure that the finished product extruded from the screw press in the second process step is pathogenically sterile. This sterilization is easily and well accomplished by the steam which is available in considerable excess from the evaporation process. This means of sterilization prevents overheating, charring or ignition of the material, all of which are detrimental, if not completely destructive, to its valuable ingredients.

The process of separating the fiber and other separable solids from the material must precede the process of evaporation because the presence of these solids virtually prevents the use of evaporation to significantly lower its water content. This separation is preferably done in a screw press or centrifuge, which accomplishes three necessary functions: (1) partially, but adequately dehydrates the sterilized material and extrudes the dehydrated effluent as finished product, (2) controls the percentage of moisture in the finished product by means of adjusting devices in the percentage of moisture in the finished product by means of adjusting devices in the press, and (3) expels a liquid effluent, which is free from fiber and other separable solids, thereby making its evaporation and concentration easily accomplished in a properly designed evaporator without detriment to its solid or dissolved ingredients.

The prior art does not extend itself to the full recovery of the nutrients contained in these liquid effluents, especially those lost through the packer's shaking screens, and thereby fails to (a) salvage a major part of the valuable ingredients contained in the material, and (b) eliminate the air and water pollution emanating therefrom.

Further, the prior art including the process described in my U.S. Pat. No. 3,550,524 exhausts the steam directly to the atmosphere and thereby fails to make use of this important energy source.

The evaporation of the effluent from the mechanical separation is accomplished in a similar piece of equipment to that used for sterilization. The same precautions with regard to overheating, charring or ignition of the material are necessary and the same provision for moisture control is required.

The efficient recovery of the nutritional ingredients in this process system which recovers the large quantities of bacteria generated in the rumen which is in addition to the food ingested by the animal so enriches the animal feed available that in most instances the product from the processes described in my U.S. Pat. No. 3,550,524 would be too rich for normal cattle feeding. For this reason a second press to treat the concentrate from the evaporator is now included. The solids extruded from the second press will also be about 50% water and will be rich in proteins, carbohydrates, vitamins and fat, but will contain substantially no fiber. The liquid effluent from this second press will be returned to the sterilizer and recycled.

Therefore, the object of this invention is to provide an improved processing system for sterilizing and dehydrating paunch manure.

Another object of the invention is to provide a processing system in which the paunch manure is isolated from contact with other materials or facilities in the packer's plant, thereby eliminating any possibility of contamination.

Another object of this invention is to accomplish thorough sterilization of the paunch manure without detriment to the finished product.

Another object of this invention is to decrease the water in the paunch manure to the optimum required for its sale or other use with little, if any, loss of its nutritional ingredients.

Another object of this invention is to accomplish both sterilization and dehydration of the material without permitting any liquid or solid effluent from the processing system to be dumped into the sewers or streams.

Another object of this invention is to overcome the extraordinary resistance of the material to heat penetration and its extremely low ignition point, by using a novel succession of sterilizing and dehydrating methods, whereby (1) the material is sterilized by steam heat to 212° F, (2) its fiber and separable solid content are separated by mechanical means and extruded as finished product, (3) the liquid effluent from the separator is concentrated by evaporation, and (4) the concentrate is recycled through the system.

Another object of this invention is to convert the acids in the liquid effluent entering the evaporator into their salts, so that the steam therefrom will be non-corrosive to mild steel parts, will not pollute the streams or atmosphere and the salts can be retained in the concentrate.

Another object of this invention is to provide an evaporator constructed to withstand up to 300 p.s.i. steam pressure thereby making the steam generated therein available for cleaning, heating, rendering any other useful purposes.

Another object of this invention is to provide a compact and inexpensive processing system, which can be readily installed in either an existing or new packing house complex.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

GENERAL DESCRIPTION OF THE DRAWINGS

FIG. 1 is a schematic plan of the successive steps in the system in which the fibrous and non-fibrous elements are combined and accumulated as a single product.

FIG. 2 is a schematic plan of the successive steps in the system in which the fibrous and non-fibrous elements are separated and separately accumulated for further processing.

DETAILED DESCRIPTION OF THE DRAWINGS

Referring now to the embodiment shown in the schematic plan view in FIG. 1, a paunch table 10 is shown, which is a facility of the packer's plant, on which the rumen from butchered animals is opened and its content washed into the inlet of a pump 12, which may be a "Moyno" pump. A hollow magnet 11 is inserted between paunch table 10 and pump 12 to pick up iron pieces often found in the material. A pressure tight pipe line 13 connects pump 12 to sterilizer 14, in which the material is sterilized by heating to 212° F. This heating is accomplished by heating the outside of the sterilizer wall and the use of agitator 15 which is preferably a conventional sweep provided with hinged scraping blades. Pipe line assembly 16 exhausts water vapors. Pump 17 moves the sterilized material through pipe line 18 into press or centrifuge 19, which separates the fibers and other separable solids and extrudes them at about 50% moisture as finished product 20. Accumulator 21 conveys the product to use or storage. Pipe line 22 conveys the liquid effluent from press 19 to acid converter 37. Pipe line 38 conveys the neutralized liquid to evaporator 23 which concentrates the liquid effluent from about 95% moisture to slightly above 75% moisture. Agitator 24 is identical to agitator 15 and accomplishes the same purpose of cleaning the heated surface and conveying heat into the body of the material. Pipe line assembly 25 conveys the steam generated in the evaporator 23 to users of power or heat. Pump 26 moves the concentrated material through pipe line 27 to sterilizer 14 where it mixes with new material and is recycled through the system.

A preferred source of heat is a conventional Dowtherm or hot oil heater. Pipe 32 is the inlet from such heater to the sterilizer or the evaporator and pipe 33 is the outlet to the heater. Level controls 34 are mounted at a suitable elevation in the sterilizer and evaporator to actuate discharge pumps 17 and 26. Viscometers 35 are provided to expel the concentrate when the fluidity of the material in the sterilizer or evaporator approaches the specific of plus 75%. Thermocouples 36 are provided in the jackets of the sterilizer and evaporator to control the temperature of the heating medium as desired.

It has been found by experience that a temperature of the liquid effluent in excess of 425° F. is destructive to the material within either the sterilizer or concentrator. It has also been found that when the moisture content of the material drops below 75%, burning and charring becomes excessive even at temperatures under 425° F.

Actual studies show that processing done under conditions in heating and moisture content outside the limits stated above resulted in the losses of nutrient shown below:

Protein — 55%
Fat — 65%
Fiber — 18%
Other — 11%

Further studies show that the gross heat load for a processing plant associated with a packing plant slaughtering 225 head of cattle per hour, is 13.5 million BTU per hour, 2.5 million BTU per hour for sterilizing and 11 million BTU per hour for water evaporation. The net heat load for evaporation is 9 million BTU per hour. In this process said 9 million BTU per hour will generate useful steam replacing energy presently separately generated.

FIG. 2 shows an identical embodiment of the invention outlined in FIG. 1 except in order to separate the non-fibrous solids in the concentrate from the evaporator a second press is introduced into the process. In this embodiment pipe 27 conveys the concentrate from the evaporator 24 to a second press 28 from which the liquid effluent is returned by pipe 27 to the sterilizer. The solids 30 from press 28 are dropped into accumulator 31. Solids 30 may be mixed in a proper ratio with solids 20 to produce a selected feed ration or they may be otherwise disposed of as a high nutrient animal feed.

By the use of this pressure tight and novel sequence of processing functions, namely, (1) sterilization by controlled heat, (2) a first mechanical separation of fiber and other separable solids in the material from its liquid content, (3) concentration of the liquid content by evaporation of its water content, (4) a second mechanical separation of separable solids in the material from the evaporator, and (5) recycling the liquid effluent from such separation through the several processes, all combined in a compact and inexpensive processing system, which (a) isolates the material and thereby prevents its contamination of other products and facilities in the packer's plant, (b) pathogenically sterilizes but does not damage any of the ingredients in the material, (c) adequately dehydrates the material without the loss of its valuable ingredients, (d) produce no air or water polluting effluent, (e) conserves the steam generated in the concentrator for useful power and heat, and (f) is readily installed in or near the packer's new or existing plant, the several objects of this invention are accomplished.

It should be understood that the foregoing disclosure described a specific embodiment of the invention and that numerous modifications and alterations may be made therein without departing from the spirit and scope of the invention as set forth in the following claims, including the use of the process to recover the nutrients in other animal waste such as cow manure.

The embodiments of the invention in which an exclusive property or privilege is claimed are defined as follows:

1. A process for converting the rumen content of a slaughtered ruminant which contains fibers and separable solids, liquids, including water, which are normally acid, into a useful product, which comprises the following steps:
   a. sterilizing said rumen content with agitation by heating said rumen content to a temperature of 212° F by indirect steam heat in a steam sterilizer and exhausting vapors from said sterilizer,
   b. mechanically separating said fibers and separable solids from said liquid into a solid material containing approximately 50% moisture and a liquid containing about 5% entrained solids by weight, utilizing said fibers and separable solids as cattle feed,
   c. neutralizing the acid in said liquid separated from said fibers and separable solids,
   d. concentrating said neutralized liquid to entrained solids containing about 75% moisture by evaporating said liquids at a temperature of less than 425° F with agitation, and forming steam,
   e. utilizing said steam from Step (d) as steam from a conventional boiler,
   f. mechanically separating said entrained solids from said concentrated material or step D into solids containing about 50% moisture content and liquid, utilizing said entrained solids as cattle feed,
   g. returning said liquid from said second mechanical separation step to said second mentioned sterilizing step and mixing said liquid with the said rumen content therein.

* * * * *